(12) United States Patent  
Marx

(10) Patent No.: US 9,610,930 B2
(45) Date of Patent: Apr. 4, 2017

(54) VEHICLE BRAKE SYSTEM

(71) Applicant: Lucas Automotive GmbH, Koblenz (DE)

(72) Inventor: Andreas Marx, Kaltenengers (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 0 days.

(21) Appl. No.: 14/367,653

(22) PCT Filed: Dec. 11, 2012

(86) PCT No.: PCT/EP2012/075058
§ 371 (c)(1),
(2) Date: Jun. 20, 2014

(87) PCT Pub. No.: WO2013/092294
PCT Pub. Date: Jun. 27, 2013

(65) Prior Publication Data
US 2014/0361607 A1     Dec. 11, 2014

(30) Foreign Application Priority Data
Dec. 20, 2011     (DE) .................. 10 2011 121 748

(51) Int. Cl.
*B60T 13/58*     (2006.01)
*B60T 8/48*     (2006.01)
(Continued)

(52) U.S. Cl.
CPC .............. *B60T 13/586* (2013.01); *B60L 7/18* (2013.01); *B60L 7/26* (2013.01); *B60T 8/4872* (2013.01);
(Continued)

(58) Field of Classification Search
CPC .... B60T 2270/604; B60T 1/10; B60T 13/586; B60T 13/142; B60T 13/686; B60T 8/4872; B60T 7/26; B60T 7/18
(Continued)

(56) References Cited

U.S. PATENT DOCUMENTS 8,123,310 B2    2/2012  Haupt et al.
8,277,365 B2   10/2012  Ohbayashi et al.
(Continued)

FOREIGN PATENT DOCUMENTS

DE    102005024339 A1    1/2006
DE    102006055799 A1    5/2008
(Continued)

*Primary Examiner* — Xuan Lan Nguyen
(74) *Attorney, Agent, or Firm* — MacMillian, Sobanski & Todd, LLC

(57) ABSTRACT

A vehicle brake system comprises an electronic control unit (ECU) for controlling a vehicle brake arrangement, and an electric machine operating as a motor and a generator. The ECU controls valves and the electric machine so that, when a brake pedal is actuated, hydraulic fluid is supplied to a wheel brake from a master cylinder to generate a brake pressure. After a corresponding brake pressure is attained, the supply of hydraulic fluid is disabled, wherein the brake pressure effected by the hydraulic fluid is gradually dissipated, and, correspondingly, the electric machine is operated increasingly as a generator. Upon an increase of driver braking demand, hydraulic fluid is additionally supplied from the master cylinder to the wheel brake, and with decreasing vehicle speed, the electric machine is operated decreasingly as a generator, and, correspondingly, hydraulic fluid is supplied to the wheel brake from an intermediate accumulator and/or from the master cylinder.

15 Claims, 5 Drawing Sheets

(51) Int. Cl.
 *B60L 7/18* (2006.01)
 *B60L 7/26* (2006.01)
 *B60T 13/14* (2006.01)
 *B60T 13/68* (2006.01)

(52) U.S. Cl.
 CPC .......... *B60T 13/142* (2013.01); *B60T 13/686* (2013.01); *B60T 2270/604* (2013.01)

(58) Field of Classification Search
 USPC ........................................................ 303/152
 See application file for complete search history.

(56) References Cited

U.S. PATENT DOCUMENTS

| | | | |
|---|---|---|---|
| 8,469,463 B2 | 6/2013 | Sonoda et al. | |
| 8,670,914 B2 | 3/2014 | Fujiki et al. | |
| 2005/0269875 A1 | 12/2005 | Maki et al. | |
| 2010/0187901 A1* | 7/2010 | Sonoda et al. | 303/11 |
| 2011/0066345 A1* | 3/2011 | Nasu et al. | 701/70 |
| 2012/0161505 A1* | 6/2012 | Koyama | 303/9.62 |
| 2013/0211685 A1 | 8/2013 | Ullrich et al. | |

FOREIGN PATENT DOCUMENTS

| | | |
|---|---|---|
| DE | 112008000673 T5 | 1/2010 |
| DE | 102009039207 A1 | 3/2011 |
| DE | 102010040190 A1 | 3/2012 |
| FR | 2926771 A1 | 7/2009 |
| JP | 2005324640 A | 11/2005 |
| JP | 2008120220 A | 5/2008 |
| WO | 2004101308 A1 | 11/2004 |
| WO | 2011132074 A2 | 10/2011 |

\* cited by examiner

VEHICLE BRAKE SYSTEM

CROSS-REFERENCE TO RELATED APPLICATIONS

This application is the National Phase of International Application PCT/EP2012/075058 filed Dec. 20, 2012 which designated the United States and published under PCT Article 21(2) on Aug. 28, 2003 as International Publication Number WO 13/092294 A1. PCT/EP2012/075058 claims priority to German Patent Application No. DE 10 2011 121 748.0, filed Dec. 20, 2011. The disclosures of both applications are incorporated herein by reference.

TECHNICAL FIELD

A vehicle brake system is described, having an electronic control unit for controlling a vehicle brake arrangement and an electric machine that may be operated both as a motor and as a generator.

BACKGROUND

Vehicles as a rule have a vehicle brake arrangement, in which by means of a hydraulic fluid a braking operation at wheel brakes of a vehicle is achieved. However, increasingly vehicles also have an electric machine, such as an electric motor, which is used to drive the vehicle at least as back-up to an internal combustion engine. Compared to an internal combustion engine, the electric machine offers the advantage that in a so-called regenerative braking operation it may be operated as a generator in order to charge a vehicle battery. The chemical energy stored in the charged battery is then reused in a motor mode of the electric machine to drive the motor vehicle.

Thus, whereas in the normal braking mode kinetic energy of the vehicle is converted to thermal energy as a result of the friction-locking interaction of brake shoes and brake disks at the wheel brakes, what occurs in the regenerative braking mode is a charging of the vehicle battery. Since in the regenerative braking mode the slowing-down of the motor vehicle is effected by means of the electric machine, the wheel brakes may remain unactuated. As a rule this is even desired since any kinetic energy converted to thermal energy at the wheel brakes is no longer available for charging the vehicle battery.

Control of the splitting of the components that implement the braking—vehicle brake system and electric machine—is effected by means of various control devices and additional devices, such as for example additional valves.

Thus, DE 10 2009 039 207 A1 describes a regenerative vehicle brake and an operating method for a regenerative vehicle brake, which comprises a regeneration device that enables an asymmetric regenerative braking mode for a first and a second hydraulic brake circuit. A vehicle having such a regenerative vehicle brake comprises a generator, wherein in the regenerative braking mode a brake pressure build-up at wheel brakes of the first brake circuit is effected at least in a reduced manner and a brake pressure build-up at wheel brakes of the second brake circuit is effected in a substantially unreduced manner. For this purpose the regeneration device comprises at least delay devices.

The regenerative vehicle brake described in DE 10 2009 039 207 A1, on the other hand, again comprises additional components for controlling the regenerative vehicle brake and for achieving a combined braking of a purely hydraulic vehicle brake arrangement and an electric machine.

DE 11 2008 000 673 T5 relates to a vehicle brake system having an electric motor that generates a wheel-driving force or a regenerative wheel-braking force. In order to improve the actuating sensation of a brake pedal in a vehicle having an electric motor that carries out the regenerative braking, has a first wheel-braking-force generating device, by means of which first wheel braking forces that are generated by the regenerative braking are applied to wheels, and a second wheel-braking-force generating device, which adjusts the pressure of a working fluid that is generated by the actuating pressure that is applied by a driver to a brake pedal. Second wheel-braking forces are applied to wheels in that the pressure is transmitted to the respective wheels, wherein the vehicle braking device applies the requisite wheel-braking forces, which correspond to the actuation of the brake pedal by the driver, to the wheels. A third wheel-braking-force generating device applies third wheel-braking forces, which differ from the first and second wheel-braking forces, to the wheels. A brake control device compensates the braking forces, which correspond to the reduction of the first wheel-braking forces, by means of third wheel-braking forces of the third wheel-braking-force generating device when the first wheel-braking forces decrease as a result of the deterioration of the conversion efficiency of the electrical energy, this occurring during the regenerative braking, while the first wheel-braking forces are applied to the wheels.

DE 10 2005 024 339 A1 relates to a vehicle braking device having a hydraulic braking device for boosting a brake-actuating force by means of a booster device upon a brake actuation for applying a basic fluid pressure, which is generated as a function of the boosted brake-actuating force, to wheel cylinders of wheels, so that a basic hydraulic braking force is generated at the wheels. A pump is used to generate and apply a controlled fluid pressure to the wheel cylinders, so that a controlled hydraulic braking force is generated at the wheels. A brake-actuating-state detection device is used to detect the brake actuating state. A regenerative braking device has the effect that an electric motor generates a regenerative braking force in accordance with the brake actuating state at the wheels, which are driven by the electric motor. A variation detection device detects the variation of an actual regenerative braking force that is actually generated by the regenerative braking device. A braking-force compensation device generates the controlled fluid pressure by driving the pump of the hydraulic braking device, so that a controlled hydraulic braking force is generated at the wheels in order to compensate the deficiency of the regenerative braking force because of the variation, which deficiency is detected by the variation detection device.

DE 10 2006 055 799 A1 relates to a method of regeneratively braking a vehicle, by means of a hydraulic or pneumatic brake system, an electromechanical brake system and a generator, wherein each of the systems contributes a specific share of a desired total deceleration of the vehicle. A braking operation may be carried out particularly easily and with a high degree of efficiency if the share of the electromechanical braking device is regulated in dependence upon the share of the generator.

DE 10 2010 040 190 A1 relates to a brake system and a method of operating a brake system having two brake circuits, having a recuperative brake, in particular an electric generator, a master cylinder and a brake pedal for improving the environmental compatibility and the energy efficiency, the full availability of the torque at low rotational speeds as well as the lower noise generation. In order with such a brake system to utilize the maximum available generator braking torque and hence also the maximum possible energy yield, the actuation of the brake pedal has to be uncoupled from the direct feed-through to the wheel brakes. Upon a braking request of the driver with an associated setpoint braking torque, given a first condition at least one outlet valve is opened and brake fluid of an associated brake fluid volume is conveyed into at least one accumulator. Then, given a second condition the at least one outlet valve is closed, wherein the first condition exists if a braking quantity corresponding to the braking request does not exceed a defined minimum value, and wherein the second condition exists if the braking fluid volume has flowed into the accumulator.

The prior art however does not include any vehicle brake systems, which offer a regenerative braking mode for a vehicle having a hydraulic vehicle brake arrangement and an electric machine, in which a splitting of the vehicle components providing the braking is controlled without additional devices and with which moreover an optimized braking and the known properties of a purely hydraulic brake arrangement are made available to a driver.

Additional devices not only have a negative impact on the additionally required space, they also give rise to higher costs and a greater control outlay. Furthermore, in vehicles having such vehicle brakes yet more devices are often provided, which simulate for the driver the impression and the response of a purely hydraulic brake arrangement. These devices likewise lead to a greater control outlay.

Underlying Problem

The problem is therefore to provide a vehicle brake system that uses existing components of a vehicle brake arrangement in order to achieve a regenerative braking mode for a vehicle having a hydraulic vehicle brake system and an electric machine that is operable as a motor and as a generator. Furthermore, the braking response and the braking sensation of a hydraulic vehicle brake arrangement are to be retained also in the regenerative braking mode.

Proposed Solution

A vehicle brake system that solves this problem comprises an electronic control unit (ECU) for controlling a vehicle brake arrangement and an electric machine that is operable as a motor and as a generator. The electronic control unit (ECU) communicates with the vehicle brake arrangement and the electric machine and is designed to operate the electric machine as a generator to achieve a vehicle braking effect. The vehicle brake arrangement comprises at least one wheel brake, a master cylinder for generating a brake pressure at the wheel brake by means of a hydraulic fluid, a feed line and a return line, a plurality of valves for controlling the supply and removal of the hydraulic fluid, as well as an intermediate accumulator. In this case the electronic control unit (ECU) is further designed to control the valves and the electric machine in such a way that upon a driver braking request through actuation of a brake pedal hydraulic fluid is fed to the wheel brake from the master cylinder via the feed line in order to generate a brake pressure at the wheel brake. After attainment at the wheel brake of the brake pressure corresponding to the driver braking request, the feed of hydraulic fluid from the master cylinder to the wheel brake is interrupted, wherein the brake pressure created by means of hydraulic fluid is gradually reduced. At the same time and to a corresponding extent the electric machine is operated increasingly as a generator in order to achieve a braking of at least one wheel of the vehicle in accordance with the driver braking request. Upon an increase of the driver braking request, hydraulic fluid is additionally fed from the master cylinder to the at least one wheel brake. As the vehicle velocity drops, the electric machine is operated decreasingly as a generator, wherein to a corresponding extent at the same time hydraulic fluid is fed from the intermediate accumulator and/or the master cylinder to the wheel brake in order to achieve at the wheel brake a brake pressure corresponding to the driver braking request.

Such a vehicle brake system leads to optimum utilization of the braking provided by means of the hydraulic vehicle brake arrangement and the electric machine. Furthermore, for the driver of a vehicle having such a vehicle brake system the result is always a braking sensation that corresponds to that of a braking operation with a purely hydraulic vehicle brake arrangement. The result is therefore a vehicle brake system with a brake pedal sensation and a deceleration response like in a purely hydraulic vehicle brake system, wherein even with high incipient braking dynamics the driver may determine the desired vehicle deceleration via the actuation of the brake pedal. An additional result is moreover a braking noise that corresponds to that of purely hydraulic vehicle brake systems.

When the driver actuates the brake pedal, hydraulic fluid is fed to the wheel brakes in accordance with the position and/or the actuation of the brake pedal, this leading to a rise of the brake pressure at the wheel brakes. The result for the driver upon actuation of the brake pedal is therefore a braking response and brake pedal sensation that is familiar to him. If the brake pedal is held in this position, i.e. there is no further actuation of the brake pedal, the feed of hydraulic fluid to the wheel brakes is interrupted by the electronic control unit (ECU). The brake pressure created by means of the hydraulic fluid is then reduced in that the quantity of hydraulic fluid that is fed to achieve the braking operation is removed from the wheel brakes. To a corresponding extent and at the same time the electric machine is additionally operated as a generator in order to achieve the braking in accordance with the driver braking request. As a result of the interruption of the feed the pressure at the brake pedal remains constant, wherein the brake pedal sensation for the driver does not alter. Nor is there any alteration of the braking response because the braking is achieved by the regenerative mode of the electric machine and not by the hydraulic vehicle brake system. The driver therefore does not notice the change of the components providing the braking. If an increase of the driver braking request then occurs as a result of actuation of the brake pedal by the driver, hydraulic fluid is then fed to the wheel brakes to the extent corresponding to the additional driver braking request. In this case too, the result for the driver is a braking response and brake pedal sensation that is familiar to him. When the vehicle velocity then drops as a result of the braking operation, the electric machine is operated decreasingly as a generator and at the same time and to a corresponding extent hydraulic fluid corresponding to the driver braking request is fed to the wheel brakes. The result during the entire braking operation up to the stationary state of the vehicle is a brake pedal sensation and braking response corresponding to that of purely hydraulic vehicle brake arrangements, without further devices being required to control the supply and removal of hydraulic fluid and the electric machine.

With this vehicle brake system an increase of the braking occurs always purely hydraulically. The blending of the braking by means of the regeneratively operable electric machine in this case occurs after an increase of the brake pressure at the wheel brakes.

In the present case the vehicle brake arrangement may comprise one brake circuit, to which all of the wheel brakes of a vehicle belong, or two or more brake circuits, wherein individual wheel brakes belong to specific brake circuits. The electronic control unit (ECU) in this case is designed to control valves in the respective brake circuits so as to result in a previously described regenerative braking operation.

In further constructions, during the reduction of the brake pressure created by means of the hydraulic fluid the hydraulic fluid may be fed to the intermediate accumulator. Consequently in a simple manner the feed of hydraulic fluid may be controlled precisely by the feeding from the intermediate accumulator to the wheel brakes. This enables an exact change from a purely hydraulic braking to a purely regenerative braking since the electronic control unit (ECU) determines the supplied and/or removed quantity of hydraulic fluid and the extent to which the electric machine is operated as a generator, wherein this is not subject to any influencing at all by the driver. In other words, use is not made of the hydraulic fluid from a brake fluid tank, the quantity and/or pressure of which may be influenced in the feed line via the master cylinder, a brake booster and the brake pedal by the driver.

In a construction of the vehicle brake system the electronic control unit (ECU) controls the electric machine and the valves in such a way that upon each further increase of the driver braking request through actuation of the brake pedal a quantity of hydraulic fluid corresponding to the increase is fed to the wheel brake in order to increase the brake pressure at the wheel brake. The electronic control unit (ECU) may further then control the electric machine and the valves in such a way that after each increase of the brake pressure at the wheel brake by means of hydraulic fluid the hydraulic fluid is fed gradually to the intermediate accumulator, and to a corresponding extent at the same time the electric machine is operated increasingly as a generator in order to achieve at the wheel a braking corresponding to the driver braking request. Consequently the braking provided by the regeneratively operated electric machine is increased successively, i.e. after each increase of the driver braking request and rise of the brake pressure at the wheel brakes, in accordance with the increase and/or the rise.

During the increase of the brake pressure at the wheel brake the electric machine may also continue to be operated as a generator to the same extent as it has already been operated to achieve the braking prior to the increase of the driver braking request. In the event of a stepwise increase of the driver braking request, only the quantity of hydraulic fluid that corresponds to the increase is then fed to the wheel brake, i.e. the brake pressure at the wheel brakes also corresponds only to this increase.

The electronic control unit (ECU) may moreover control the electric machine also in such a way that the braking provided by the electric machine is reduced when the driver braking request decreases as a result of a change of the position of the brake pedal. If the driver braking request reduces, then the braking provided by the regeneratively operated electric machine is also reduced, wherein as the vehicle velocity drops the braking that is available from the electric machine is likewise reduced.

The brake pressure at the wheel brake corresponding to the additionally fed hydraulic fluid in this case corresponds to the difference of the varied driver braking request and the driver braking request prior to the increase. Thus, compared to purely hydraulic vehicle brake systems the brake pressure is increased only minimally, this having a positive impact on the service life of the component parts of the vehicle brake system.

The sum of the brake pressure provided by means of the hydraulic fluid at the wheel brake and the braking provided by the regeneratively operated electric machine may always correspond to the driver braking request, wherein as a result the braking always corresponds to the position of the brake pedal and the driver braking request. The driver therefore also does not notice any variation in the braking response because of a change, since the sum of the respective braking operations (hydraulic and regenerative) during the change from purely hydraulic to purely regenerative and from purely regenerative to purely hydraulic is always identical.

The vehicle brake system may moreover comprise a pump for feeding the hydraulic fluid from the intermediate accumulator.

The intermediate accumulator of the vehicle brake arrangement may moreover be connected to the feed line. For this reason, as the vehicle velocity drops, the pressure build-up in the feed line may be controlled by the electronic control unit (ECU) in that it varies the rotational speed of the pump. In other words, the hydraulic fluid stored in the intermediate accumulator is used for the pressure build-up at the wheel brakes, with the result that through the control of the pump a more precise feed of hydraulic fluid to the wheel brakes and a more precise changeover of the hydraulic and regenerative braking may be achieved in order always to achieve a uniform braking operation.

Disruptive influences affecting the pump and the regulation of the flow rate of hydraulic fluid are corrected by means of previously determined characteristics maps in the electronic control unit (ECU). Such disruptive influences may be an upstream pressure in the brake lines—supply- and return line—and/or at the wheel brakes, the temperature of the hydraulic fluid, of the wheel brakes or the ambient temperature, as well as fluctuations in the supply voltage.

The electronic control unit (ECU) of the vehicle brake system may be implemented in a vehicle-/brake controller and hence be accommodated in an existing controller of a vehicle. This reduces the cost of such a vehicle brake system. What is more, it is therefore also possible without considerable outlay to retrofit an electric machine in a vehicle with a vehicle brake arrangement and provide a regenerative vehicle brake system as described herein, wherein for control purposes only existing components are used.

In order to generate a brake pressure at the wheel brake the electronic control unit (ECU) may open valves in the feed line and, after attainment at the wheel brake of the brake pressure corresponding to the driver braking request, may further interrupt the feed of hydraulic fluid from the master cylinder to the wheel brake in the feed line by closing at least one of the valves in the feed line. In order to reduce the brake pressure at the wheel brake that is created by means of the hydraulic fluid, the electronic control unit (ECU) may open a valve between the wheel brake and the intermediate accumulator in the return line and close the valve between the wheel brake and the intermediate accumulator in the return line after the reduction of the brake pressure at the wheel brake created by means of the hydraulic fluid. As the vehicle velocity drops, the electronic control unit (ECU) may moreover open the valve between the wheel brake and the intermediate accumulator and/or at least one of the valves in the feed line.

BRIEF DESCRIPTION OF THE DRAWINGS

Further aims, features, advantages and possible applications emerge from the following description of embodiments, which are to be interpreted as not restrictive, with reference to the associated drawings. All of the features described and/or graphically represented here, on their own or in any combination, form the presently disclosed subject matter, also independently of their grouping in the claims or their relations. The dimensions and proportions of the components shown in the figures are in the present case not absolutely true to scale; they may vary from the pictorialized in forms of construction that are to be implemented.

DETAILED DESCRIPTION FO THE CONSTRUCTIONAL VARIANTS

Figure 1:
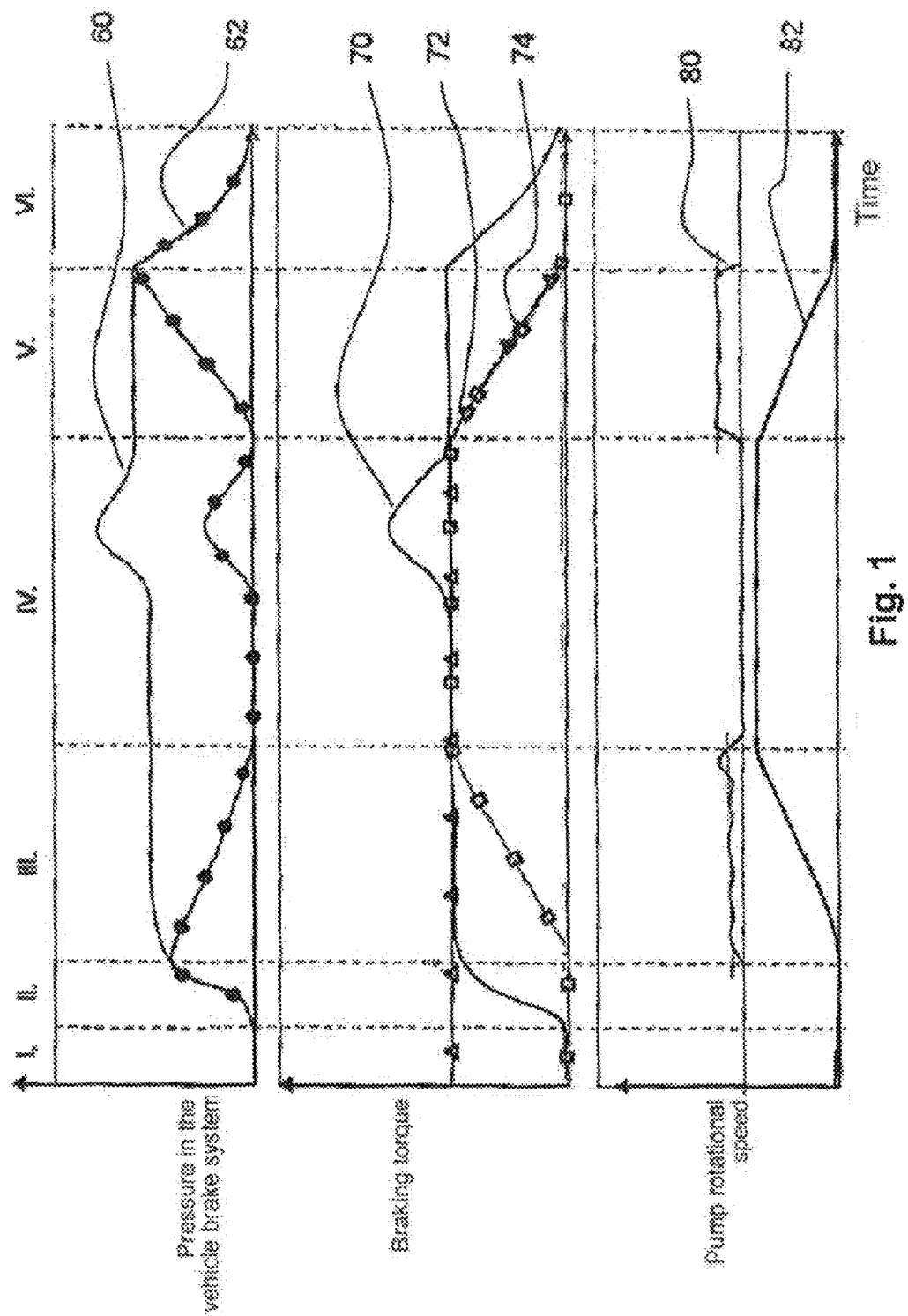
FIG. 1 shows characteristics of the pressure of the hydraulic fluid, a braking torque, a filling of the intermediate accumulator and a pump rotational speed over time.

There now follows a description of embodiments of a regenerative vehicle brake system. In this, matching elements are denoted by the same reference characters in the figures.

FIG. 1 shows the characteristic and/or the pressure rise and fall of the hydraulic fluid in a purely hydraulic vehicle brake system and in a regenerative vehicle brake system over time. Line 60 shows the pressure characteristic of the hydraulic fluid in a purely hydraulic vehicle brake system and line 62 shows the pressure characteristic of the hydraulic fluid in a regenerative vehicle brake system.

The characteristics and further representations in FIG. 1 are subdivided into six sections, wherein the first section I. represents the state, in which there is no actuation of a brake pedal 12 and so the vehicle brake system is inactive.

The second section II. represents the state, in which the brake pedal 12 is actuated and a braking operation is carried out by the vehicle brake system. In this case, in section II. in both vehicle brake systems an almost identical pressure build-up occurs in brake lines and/or at wheel brakes 24a, 24b of the vehicle.

The third section III. represents the state, in which the pressure of the hydraulic fluid in a purely hydraulic vehicle brake system is kept substantially at a level, and in the regenerative vehicle brake system, as described herein, the pressure is gradually reduced.

In the fourth section IV. the brake pressure provided by means of the hydraulic fluid in the regenerative vehicle brake system is reduced to the maximum extent, wherein upon a further actuation of the brake pedal 12 a quantity of hydraulic fluid corresponding to the additional actuation is fed to a wheel brake 24a, 24b, this leading to a pressure rise in the brake lines and the wheel brakes 24a, 24b of the vehicle brake system. When the driver then reduces the pressure on the brake pedal 12, i.e. the brake pedal 12 is actuated to a lesser extent by the driver, the brake pressure is correspondingly reduced. In the example shown in FIG. 1 the brake pressure is reduced to the pressure level prevailing prior to the further actuation. "Reduced to the maximum extent" in the above-mentioned sense means that the pressure of the hydraulic fluid at the wheel brakes corresponds to the pressure in the case of non-actuation of the wheel brakes 24a, 24b and to a pressure in a regular travelling state of the vehicle without braking; for the pressure may be reduced at most only to the point where the regenerative braking torque is used up.

In the purely hydraulic vehicle brake system, in the fourth section IV. upon a further actuation of the brake pedal hydraulic fluid is additionally fed to the wheel brakes, wherein the pressure in the brake lines of the vehicle brake system and/or the brake pressure at the wheel brakes increases in a corresponding manner.

The fifth section V. shows the state of a regenerative vehicle brake system, in which, as the vehicle velocity decreases, the pressure in the brake lines of the vehicle is gradually built up in order to achieve a brake pressure at the wheel brakes 24a, 24b. In the purely hydraulic vehicle brake system, on the other hand, the pressure is at the same level as after the increase of the pressure resulting from the further actuation of the brake pedal 12.

The sixth section VI. represents the state, in which the brake pressure in the purely hydraulic vehicle brake system and the regenerative vehicle brake system decreases, because the vehicle has been decelerated sufficiently in accordance with the driver braking request or is in a stationary state.

FIG. 1 additionally shows the characteristic 70 of the total braking torque prevailing at the wheel brake 24a, 24b and the characteristic 74 of the braking torque provided by the electric machine as well as the braking power 72 that is available from the electric machine and is a function of the vehicle velocity.

In a regenerative vehicle brake system the electric machine as a function of the vehicle velocity makes available a torque 74 that may be used to brake the vehicle. This torque 74 in section III. is gradually used in order to achieve at a wheel of the vehicle the braking that is provided by a hydraulic vehicle brake arrangement 10. Furthermore, in section III. the braking provided by the hydraulic vehicle brake arrangement 10 gradually decreases as a result of a reduction of the brake pressure at the wheel brake 24a, 24b and at the same time the braking torque of the electric machine operated as a generator that is effective at the wheel of the vehicle gradually increases to a corresponding extent. In this case the total braking torque 70 prevailing at the wheel—provided by the electric machine operated as a generator and by the braking via the wheel brakes 24a, 24b—remains substantially constant, i.e. corresponds to the braking request selected by the driver via the position of the brake pedal 12. Since, as the vehicle velocity decreases, the braking power 72 available from the electric machine likewise decreases, the braking at the wheel of the vehicle by the electric machine is gradually reduced in section V., wherein at the same time to a corresponding extent hydraulic fluid is fed to the wheel brake 24a, 24b. The characteristic of the total braking torque 70, provided by the regenerative vehicle brake system comprising the vehicle brake arrangement 10 and the electric machine operable as a motor and a generator, therefore corresponds to the braking supplied by the pressure 60 that is provided by a purely hydraulic vehicle brake system for achieving the identical braking.

FIG. 1 further shows the pump rotational speed 80 of a pump 28 for feeding hydraulic fluid in the regenerative vehicle brake system as well as the filling conditions 82 of the intermediate accumulator 26. In accordance with the reduction of the brake pressure at the wheel brake 24*a*, 24*b* and the relieving of the brake pressure at the wheel brake 24*a*, 24*b* hydraulic fluid is fed to the intermediate accumulator 26. Thus, in section III. hydraulic fluid is fed to the intermediate accumulator 26, for which reason the filling condition of the intermediate accumulator increases, and in section V. hydraulic fluid is removed from the intermediate accumulator 26 to increase the brake pressure at the wheel brake 24*a*, 24*b*, for which reason the filling condition in section V. decreases, in accordance with the state prior to reduction of the brake pressure at the wheel brake 24*a*, 24*b* in section III. In section III. the pump 28 may be operated to assist in the removal of the hydraulic fluid from the wheel brakes 24*a*, 24*b*. In section V. the pump 28 is operated to feed the hydraulic fluid from the intermediate accumulator 26 to the wheel brakes 24*a*, 24*b*.

FIGS. 2 to 5 show a vehicle brake arrangement 10 for a vehicle having two brake circuits, wherein in the following the regenerative vehicle brake system is described with reference to one brake circuit. What is said regarding the components of this brake circuit applies correspondingly to the other brake circuit. The vehicle brake arrangement 10 shown in FIGS. 2 to 5 comprises a brake pedal 12, which is connected by a brake booster 14 to a master cylinder 16. The master cylinder 16 is connected to a brake fluid tank 18, in which the hydraulic fluid is kept in stock. Via the feed line 20 the first brake circuit is connected by valves 30, 32 and 36 to the wheel brakes 24*a* and 24*b*. From the wheel brakes 24*a* and 24*b* return lines 22*a* and 22*b* lead via valves 34 and 38 to the intermediate accumulator 26, which may be filled and emptied by means of the pump 28. In other words, the pump 28 is designed to remove hydraulic fluid from the wheel brakes 24*a*, 24*b* and feed it to the intermediate accumulator 26, as well as to feed hydraulic fluid from the intermediate accumulator 26 to the wheel brakes 24*a* and 24*b*. The pump 28 is moreover connectable at the intake side by a valve 40 to the brake fluid tank 18. As a result of opening of the valve 40 the pump 28 may therefore draw in hydraulic fluid from the fluid tank 18. Furthermore, the valves 30, 32, 34, 36 and 38 comprise a non-return valve that is used for pressure limiting.

The valves 30, 32 and 36 may be designed as valves that are open in their normal setting and hence allow hydraulic fluid to flow through, and the valves 34 and 38 as well as the valve 40 may be designed as valves that are closed in their normal setting and hence prevent hydraulic fluid from flowing through. It is however equally possible to use other valves to achieve the same effect.

A pedal displacement sensor may moreover be disposed on the brake pedal to detect the actuation of the brake pedal 12. Further components of a hydraulic vehicle brake arrangement are not represented here for the sake of clarity. It is however obvious that a vehicle brake system may comprise further components, wherein these are not absolutely required for understanding the present vehicle brake system.

Figure 2:
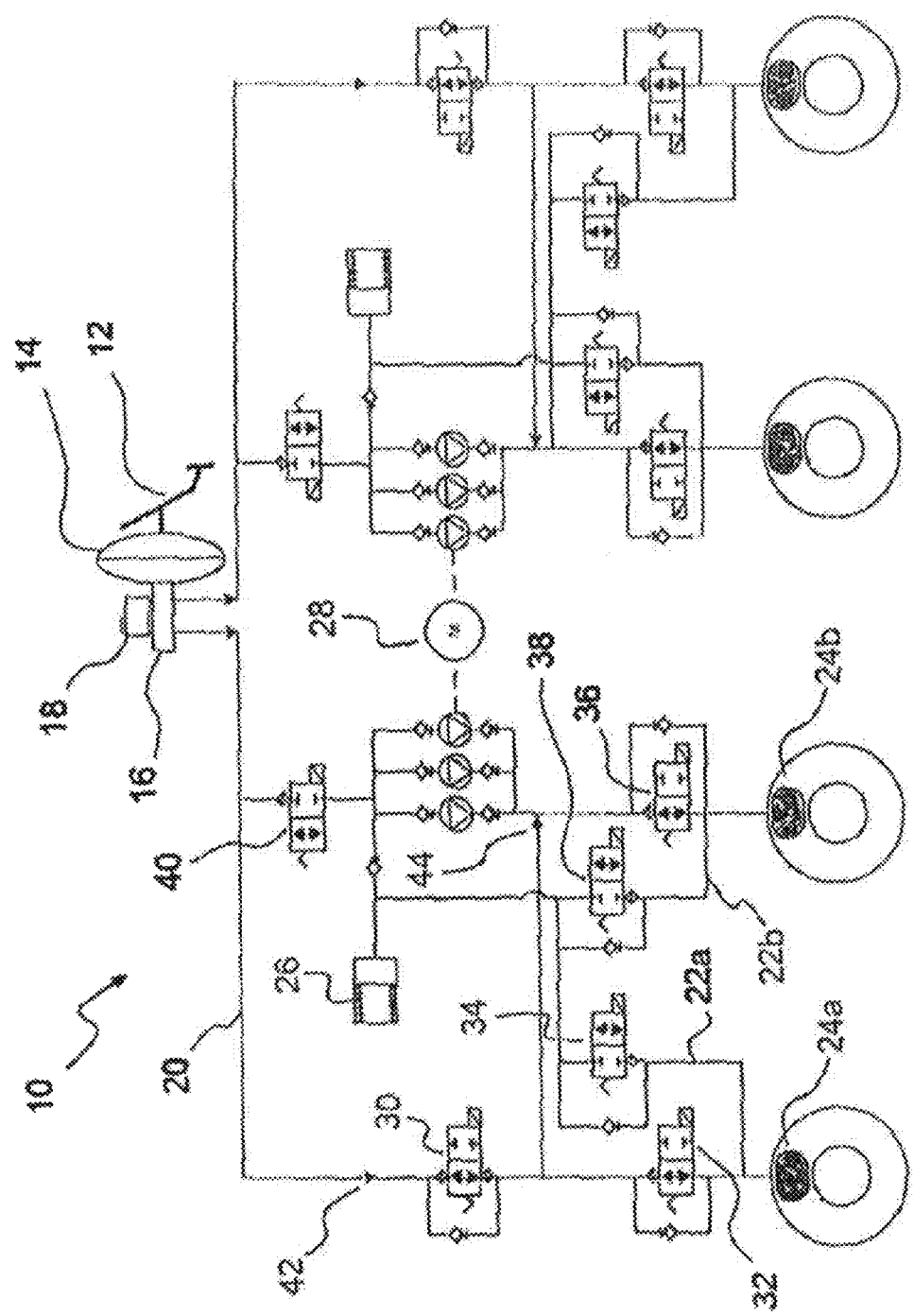
FIG. 2 shows a diagrammatic representation of a vehicle brake arrangement, which is part of a regenerative vehicle brake system, in a first state.

FIG. 2 shows a diagrammatic representation of a vehicle brake arrangement 10, which is part of the regenerative vehicle brake system, in a first state. The state of the vehicle brake system 10 that is represented here corresponds to the section II. of FIG. 1.

When the driver actuates the brake pedal 12, hydraulic fluid corresponding to the driver braking request based on the position of the brake pedal 12 is fed from the brake fluid tank 18 by means of the master cylinder 16 through the open valves 30 and 32 and/or 30 and 36 to the wheel brakes 24*a*, 24*b*. The arrows 42 and 44 indicate the feed of hydraulic fluid. The valves 34 and 38 are closed in order to build up the brake pressure.

Figure 3:
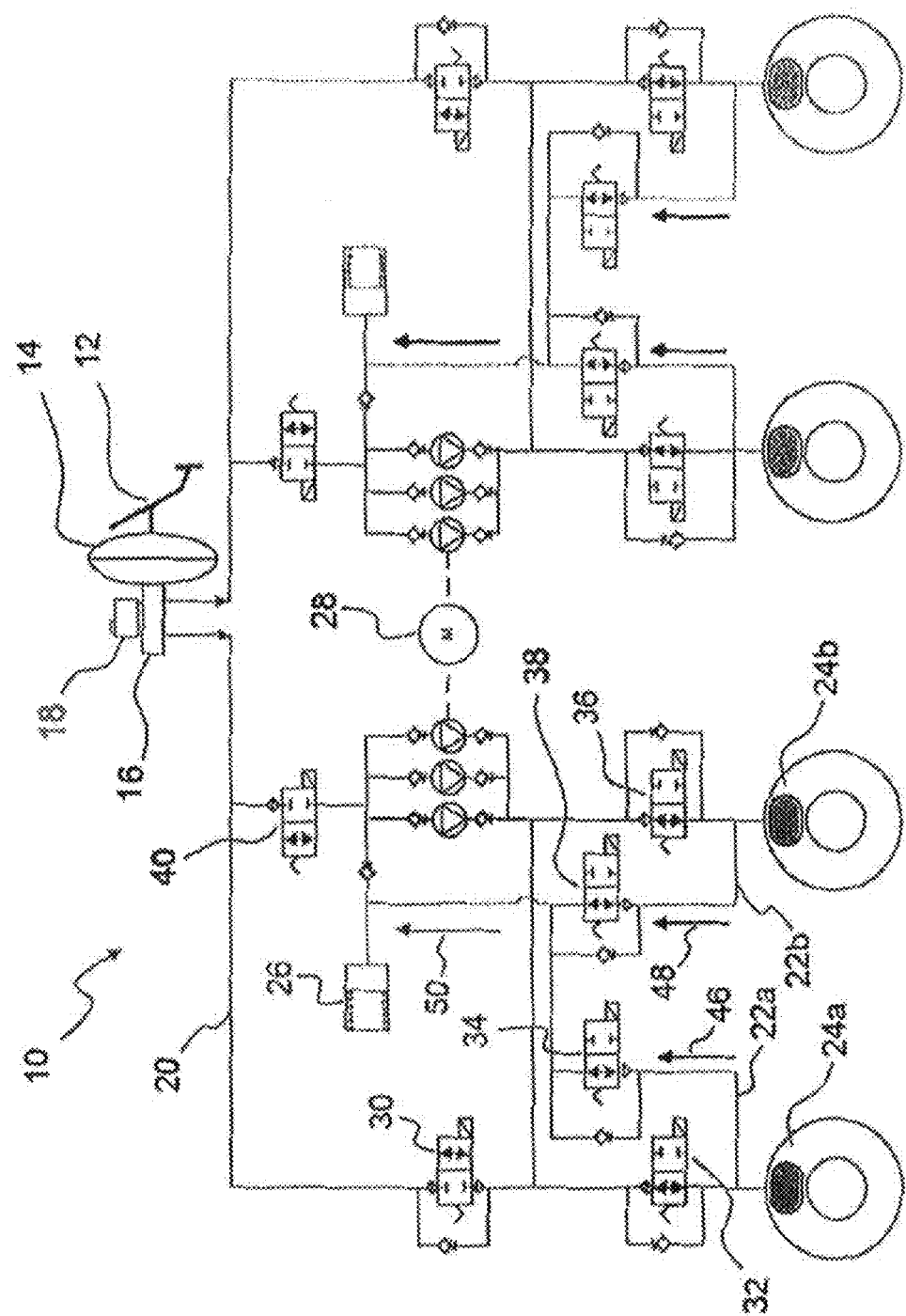
FIG. 3 shows a diagrammatic representation of a vehicle brake arrangement, which is part of a regenerative vehicle brake system, in a second state.

FIG. 3 shows a diagrammatic representation of a vehicle brake arrangement 10, which is part of the regenerative vehicle brake system, in a second state. The state of the vehicle brake arrangement 10 represented here corresponds to the section III. of FIG. 1.

If a pressure build-up of the hydraulic fluid has occurred and there is no further actuation of the brake pedal 12 by the driver, i.e. the brake pedal 12 is held in an actuated position, the valve 30 is closed by the electronic control unit (ECU) and the valves 34 and 38 are opened by the ECU. The ECU additionally controls the pump 28 in such a way that it feeds hydraulic fluid from the wheel brakes 24*a*, 24*b* through the open valves 34, 38 to the intermediate accumulator 26 in order to relieve the pressure prevailing at the wheel brakes 24*a*, 24*b* as a result of the actuation of the brake pedal 12. The arrows 46, 48 and arrow 50 indicate the feed of hydraulic fluid from the wheel brakes 24*a*, 24*b* to the intermediate accumulator 26. At the same time the ECU controls the electric machine in such a way that it implements a braking at the wheels of the vehicle in accordance with the brake pressure prevailing at the wheel brakes 24*a*, 24*b* as a result of the actuation of the brake pedal 12.

The pressure build-up and the regenerative braking by the electric machine is in this case effected gradually, wherein the change from purely hydraulic braking to purely regenerative braking may occur successively, i.e. a continuous rise and/or fall as represented in the figures or however also step-by-step and/or incrementally. An exponential rise and/or fall would moreover also be possible.

By virtue of the closed valve 30 the pressure between the valve 30 and the master cylinder 16 and/or the brake pedal 12 remains constant, with the result that the driver does not notice any variation.

The ECU in this case controls the extent to which the electric machine is operated as a generator to achieve a braking at the wheels of the vehicle and the extent to which hydraulic fluid is fed from the wheel brakes 24*a*, 24*b* to the intermediate accumulator. Through control of the rotational speed of the pump 28 a very accurate control of the quantity of hydraulic fluid and hence an adaptation of the hydraulic braking to the extent of braking by the electric machine is possible. In this case the total braking achieved at a wheel of the vehicle by means of the electric machine and the hydraulic fluid is always kept constant. This is effected by means of the ECU, which via further devices such as sensors and the like that are in any case used in the vehicle, may detect the extent of the braking of the electric machine, as well as the braking power available therefrom and the brake pressure at the wheel brakes 24*a*, 24*b* and use these to determine the quantity of hydraulic fluid and the extent of the braking by the electric machine.

If a sufficient pressure reduction has occurred at the wheel brakes 24*a*, 24*b* and the braking corresponding to the driver braking request is provided exclusively by the regeneratively operated electric machine, then the valves 34 and 38 are closed again by the ECU.

Figure 4:
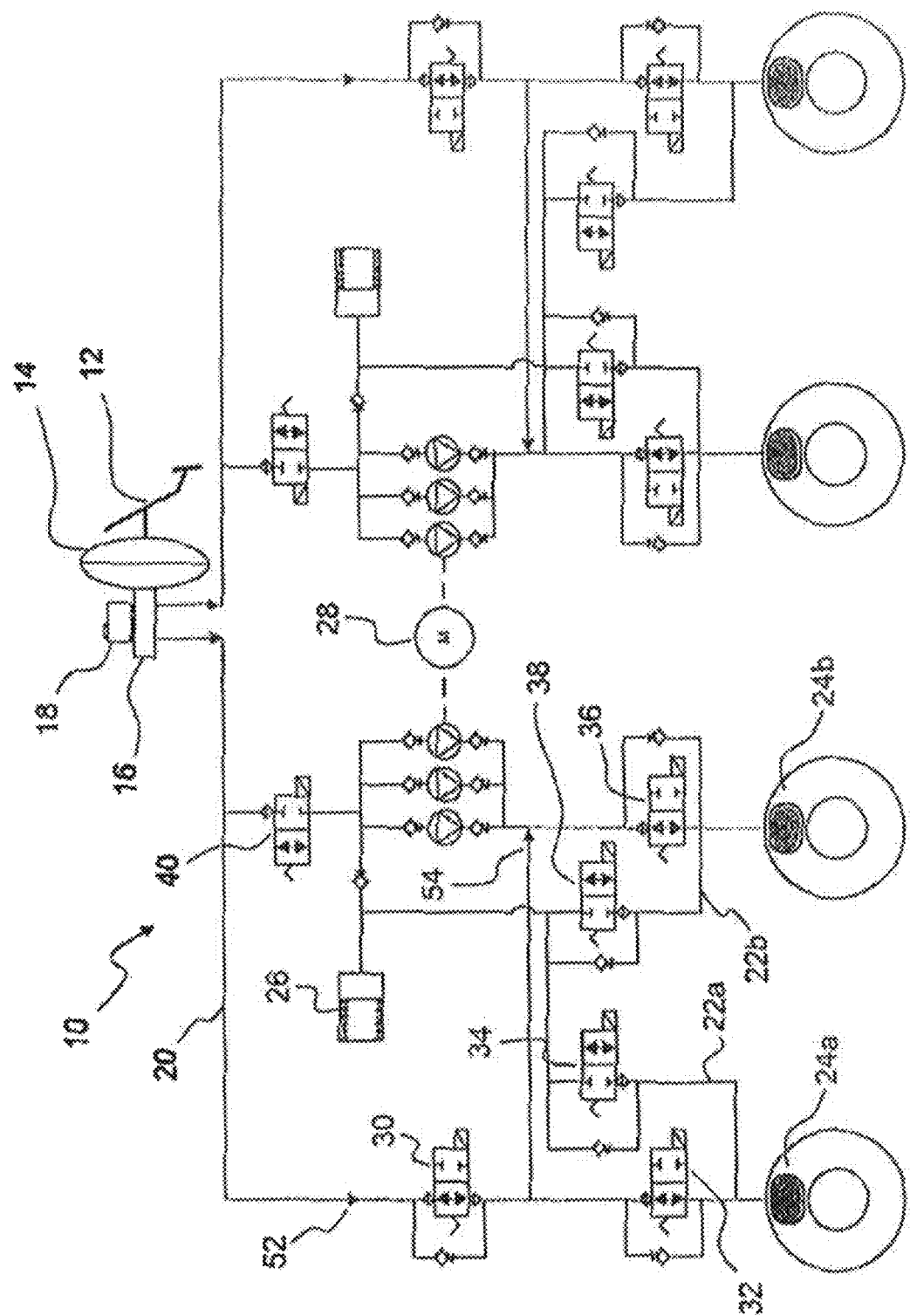
FIG. 4 shows a diagrammatic representation of a vehicle brake arrangement, which is part of a regenerative vehicle brake system, in a third state.

FIG. 4 shows a diagrammatic representation of a vehicle brake arrangement 10, which is part of the regenerative vehicle brake system, in a third state. The state of the vehicle brake arrangement 10 represented here corresponds to the section IV. of FIG. 1.

If a further actuation of the brake pedal 12 by the driver occurs, the ECU opens the valve 30 and hydraulic fluid is fed, as represented by the arrows 52, 54, to the wheel brakes 24a, 24b through the open valves 32, 36. In this case, the quantity of hydraulic fluid fed to the wheel brakes 24a, 24b and/or a build-up of the brake pressure achieved at the wheel brakes 24a, 24b is merely such that it corresponds to the further actuation of the brake pedal 12. If the driver braking request reduces again, the hydraulic fluid additionally fed to the wheel brakes 24a, 24b may be fed back through the open valves 30, 32 and 36 and/or the brake pressure corresponding to the further actuation of the brake pedal 12 may be relieved. After the further actuation the valve 30 is closed again by the ECU.

It is in this case also possible for the ECU to increase or decrease the braking provided by the regeneratively operated electric machine to a specific extent corresponding to a varied driver braking request.

Figure 5:
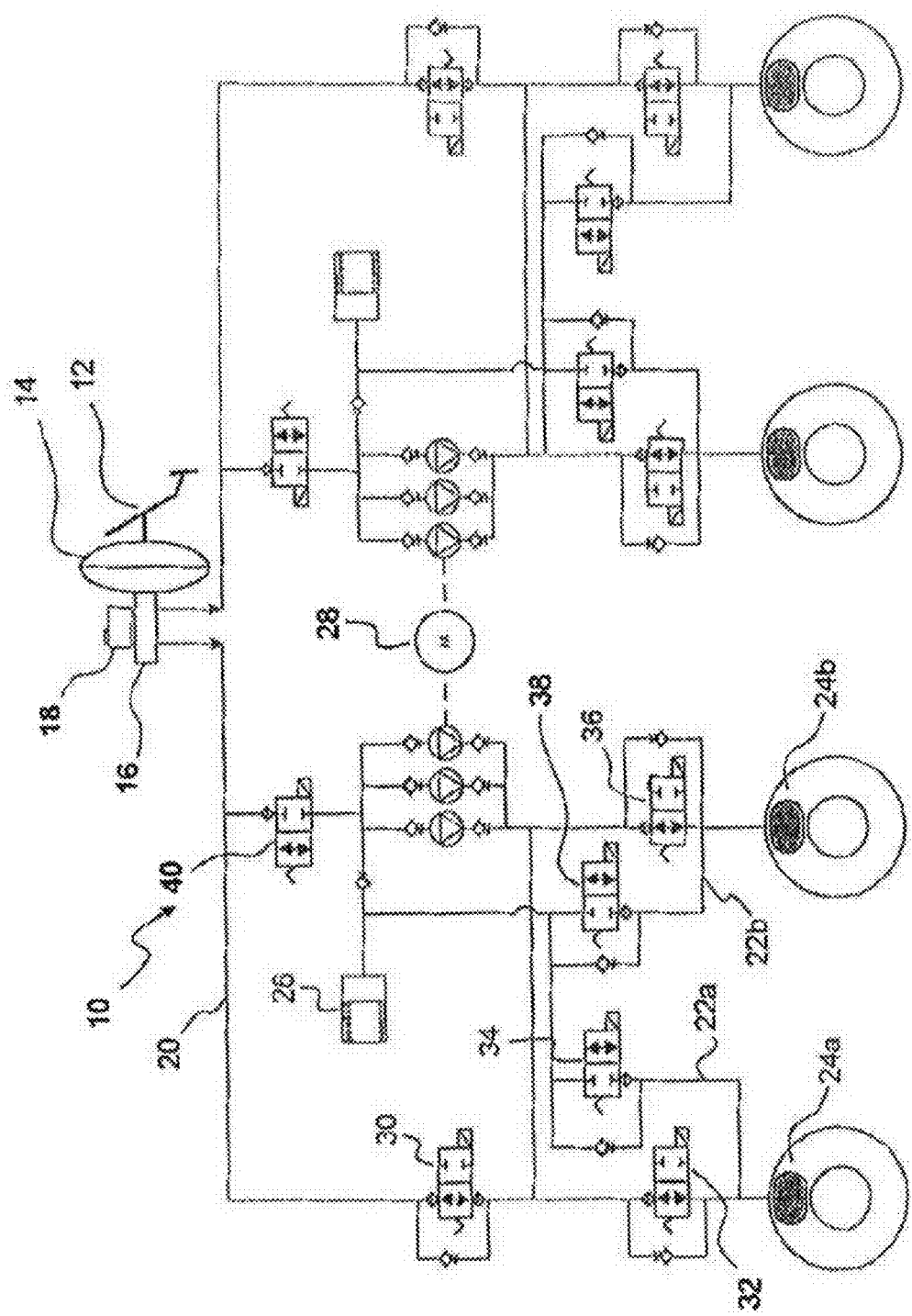
FIG. 5 shows a diagrammatic representation of a vehicle brake arrangement, which is part of a regenerative vehicle brake system, in a fourth state.

FIG. 5 shows a diagrammatic representation of a vehicle brake arrangement 10, which is part of the regenerative vehicle brake system, in a fourth state. The state of the vehicle brake arrangement 10 represented here corresponds to the section V. of FIG. 1.

When the vehicle velocity drops as a result of the braking of the vehicle, the braking power available from the electric machine is also reduced. The valve 30 is therefore opened by the ECU and hydraulic fluid is gradually fed by means of the pump 28 to the wheel brakes 24a, 24b so that a braking corresponding to the driver braking request arises at the wheels of the vehicle. At the same time the regenerative braking of the wheels that is provided by the electric machine is gradually reduced. In this case the pump 28 and the electric machine are controlled in such a way that a gradual change from the purely regenerative braking to the purely hydraulic braking occurs, wherein the total braking at the wheels of the vehicle is kept permanently constant by virtue of corresponding control by means of the ECU.

The invention claimed is:

1. Vehicle brake system having an electronic control unit (ECU) for controlling a vehicle brake arrangement and an electric machine operable as a motor and a generator, wherein the ECU communicates with the vehicle brake arrangement and the electric machine and is designed to operate the electric machine as the generator to achieve a vehicle braking effect, and wherein the vehicle brake arrangement comprises at least one wheel brake, a master cylinder for generating a brake pressure at the wheel brake by means of a hydraulic fluid, a feed line and a return line, a plurality of valves for controlling the supply and removal of the hydraulic fluid, and an intermediate accumulator, wherein the ECU is further designed to control the valves and the electric machine in such a way that upon a driver braking request through actuation of a brake pedal hydraulic fluid is fed to the wheel brake from the master cylinder through the feed line in order to generate the brake pressure at the wheel brake, upon attainment at the wheel brake of the brake pressure corresponding to the driver braking request the feed of hydraulic fluid from the master cylinder to the wheel brake is interrupted, wherein the brake pressure created by means of hydraulic fluid is gradually reduced and to a corresponding extent at the same time the electric machine is operated increasingly as the generator in order to achieve a braking of at least one wheel of the vehicle corresponding to the driver braking request, upon an increase of the driver braking request hydraulic fluid is additionally fed from the master cylinder to the at least one wheel brake, and, as the vehicle velocity drops, the electric machine is operated decreasingly as the generator and to a corresponding extent at the same time hydraulic fluid is fed from at least one of the intermediate accumulator and the master cylinder to the wheel brake in order to achieve at the wheel brake the brake pressure corresponding to the driver braking request, wherein the ECU controls the electric machine and the valves in such a way that upon each further increase of the driver braking request through actuation of the brake pedal a quantity of hydraulic fluid corresponding to the increase is fed to the wheel brake in order to increase the brake pressure at the wheel brake, and that after each increase of the brake pressure at the wheel brake by means of hydraulic fluid, the hydraulic fluid is fed gradually to the intermediate accumulator, and to a corresponding extent at the same time the electric machine is operated increasingly as the generator in order to achieve at the wheel the braking corresponding to the driver braking request.

2. Vehicle brake system according to claim 1, wherein the ECU controls the electric machine in such a way that upon an increase of the driver braking request the electric machine during the increase of the brake pressure at the wheel brake continues to be operated as a generator to the extent corresponding to the braking by the electric machine prior to the increase of the driver braking request.

3. Vehicle brake system according to claim 1, wherein the ECU controls the electric machine in such a way that the braking provided by the electric machine is reduced when the driver braking request decreases as a result of a change of the position of the brake pedal.

4. Vehicle brake system according to claim 1, wherein the brake pressure provided at the wheel brake and corresponding to the additionally fed hydraulic fluid corresponds to the difference of the varied driver braking request and the driver braking request prior to the increase.

5. Vehicle brake system according to claim 1, wherein the sum of the brake pressure provided by means of the hydraulic fluid at the wheel brake and the braking provided by the regeneratively operated electric machine always corresponds to the driver braking request.

6. Vehicle brake system according to claim 1, wherein the vehicle brake system comprises a pump for feeding the hydraulic fluid from the intermediate accumulator.

7. Vehicle brake system according to claim 6, wherein the intermediate accumulator is connected to the feed line and, as the vehicle velocity drops, the pressure build-up in the feed line is controlled in that the ECU varies the rotational speed of the pump.

8. Vehicle brake system according to claim 7, wherein disruptive influences affecting the pump and the regulation of the flow rate of hydraulic fluid are corrected by means of previously determined characteristics maps in the ECU.

9. Vehicle brake system according to claim 1, wherein the ECU is implemented in a vehicle-braking controller.

10. Vehicle brake system according to claim 1, wherein the ECU in order to generate a brake pressure at the wheel brake opens valves in the feed line.

11. Vehicle brake system according to claim 1, wherein the ECU after attainment at the wheel brake of the brake pressure corresponding to the driver braking request interrupts the feed of hydraulic fluid from the master cylinder to the wheel brake in the feed line by closing at least one of the valves in the feed line.

12. Vehicle brake system according to claim 1, wherein during the reduction of the brake pressure created by means of the hydraulic fluid the hydraulic fluid is fed to the intermediate accumulator.

13. Vehicle brake system according to claim 1, wherein the ECU in order to reduce the brake pressure created at the wheel brake by means of the hydraulic fluid opens a valve between the wheel brake and the intermediate accumulator in the return line.

14. Vehicle brake system according to claim 1, wherein the ECU closes the valve between the wheel brake and the intermediate accumulator in the return line after the reduction at the wheel brake of the brake pressure created by means of the hydraulic fluid.

15. Vehicle brake system according to claim 1, wherein, as the vehicle velocity drops, the ECU opens the valve between the wheel brake and at least one of the intermediate accumulator and at least one of the valves in the feed line.

\* \* \* \* \*